United States Patent
Jiang et al.

(10) Patent No.: US 11,640,732 B2
(45) Date of Patent: May 2, 2023

(54) SYSTEM AND METHOD FOR GENERATING DIAGNOSTIC PROCEDURE FOR VEHICLE FAULT BASED ON MOST PROBABLE CAUSES

(71) Applicant: GM GLOBAL TECHNOLOGY OPERATIONS LLC, Detroit, MI (US)

(72) Inventors: Shengbing Jiang, Rochester Hills, MI (US); Zifeng Peng, Rochester Hills, MI (US); Michael B. Gastmeier, Clinton Township, MI (US); Brian Buck, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 17/333,329

(22) Filed: May 28, 2021

(65) Prior Publication Data
US 2022/0383669 A1 Dec. 1, 2022

(51) Int. Cl.
*G07C 5/08* (2006.01)

(52) U.S. Cl.
CPC .................... *G07C 5/0808* (2013.01)

(58) Field of Classification Search
CPC ..................................................... G07C 5/0808
See application file for complete search history.

(56) References Cited

U.S. PATENT DOCUMENTS 10,275,548 B1 * 4/2019 Kodali ................. G06F 30/20
2020/0184742 A1   6/2020 Jiang et al.

FOREIGN PATENT DOCUMENTS

WO   WO-2014173818 A2 * 10/2014 ............. G07C 5/008
WO   WO-2019109915 A1 *  6/2019 ............. G05B 23/02

OTHER PUBLICATIONS

U.S. Appl. No. 17/333,344, filed May 28, 2021, Jiang et al.

* cited by examiner

*Primary Examiner* — Joseph J Dallo

(57) ABSTRACT

A system includes a diagnostic step module and an optimal diagnostic procedure module. The diagnostic step module is configured to identify diagnostic steps of a service procedure to be performed to diagnose a root cause of a fault on a vehicle based on a diagnostic trouble code identifying the fault, and identify a cost associated with performing each of the diagnostic steps. The optimal diagnostic procedure module is configured to determine an order in which to perform the diagnostic steps that minimizes the cost of diagnosing the fault, and output an optimal diagnostic procedure that indicates the diagnostic steps and the order in which to perform the diagnostic steps.

20 Claims, 7 Drawing Sheets

|    | 72 | 74 | 76       | 78 |
|----|----|----|----------|----|
| 66 | -  | 80 | 82, 84, 86 | 10 |
| 68 | 66 | 86 | 82, 84   | 15 |
| 70 | -  | 82 | 84       | 20 |

| 69 | 71  |
|----|-----|
| 80 | 50% |
| 86 | 25% |
| 82 | 15% |
| 84 | 10% |

# SYSTEM AND METHOD FOR GENERATING DIAGNOSTIC PROCEDURE FOR VEHICLE FAULT BASED ON MOST PROBABLE CAUSES

CROSS-REFERENCE TO RELATED APPLICATIONS

This application is related to U.S. patent application Ser. No. 17/333,344 filed on May 28, 2021 and entitled "System and Method for Determining Most Probable Cause of Vehicle Fault Using Multiple Diagnostic Techniques." The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for generating a diagnostic procedure for a vehicle fault based on most probable causes.

A controller of a vehicle typically sets a diagnostic trouble code and activates a service indicator (e.g., a check engine light) when the vehicle has an issue. The controller determines that the vehicle has the issue when one or more operating parameters of the vehicle are within a predetermined range. The service indicator informs the vehicle user to bring the vehicle to a repair shop for service. A service technician connects a service tool to the controller to retrieve the diagnostic trouble codes that are set and identifies the issue based on the diagnostic trouble code.

SUMMARY

An example of a system according to the present disclosure includes a diagnostic step module and an optimal diagnostic procedure module. The diagnostic step module is configured to identify diagnostic steps of a service procedure to be performed to diagnose a root cause of a fault on a vehicle based on a diagnostic trouble code identifying the fault, and identify a cost associated with performing each of the diagnostic steps. The optimal diagnostic procedure module is configured to determine an order in which to perform the diagnostic steps that minimizes the cost of diagnosing the fault, and output an optimal diagnostic procedure that indicates the diagnostic steps and the order in which to perform the diagnostic steps.

In one aspect, the diagnostic step module is configured to identify preparation steps that multiple ones of the diagnostic steps have in common with one another, and the optimal diagnostic procedure module is configured to determine the order in which to perform the diagnostic steps based on the common preparation steps.

In one aspect, the diagnostic step module is configured to identify those of the diagnostic steps that are prerequisites for others of the diagnostic steps, and the optimal diagnostic procedure module is configured to determine the order in which to perform the diagnostic steps based on the prerequisite diagnostic steps.

In one aspect, if the diagnostic steps involve replacing a part on the vehicle, the diagnostic step module is configured to include the cost of the part in the cost of performing the diagnostic steps.

In one aspect, the optimal diagnostic procedure module is configured to determine the order in which to perform the diagnostic steps based on the cost of performing the diagnostic steps and a probability that performing the diagnostic steps will resolve the fault.

In one aspect, the service procedure groups the diagnostic steps into tests, and the optimal diagnostic procedure module is configured to determine the order in which to perform the tests that minimizes the cost of diagnosing the fault.

In one aspect, the optimal diagnostic procedure module is configured to select different ones of the tests to perform first, determine the cost of performing the diagnostic steps of the selected test, determine a minimum cost of performing the diagnostic steps of each of the other tests, determine a sum the cost of performing the diagnostic steps of the selected test and the minimum cost of performing the diagnostic steps of the other tests, and set the order in which to perform the tests so that the selected test is performed first when the sum is less than the sum of the cost of performing any of the other tests first and the minimum cost of performing the selected test and the remainder of the other tests.

Another example of a system according to the present disclosure includes a diagnostic step module and a suboptimal diagnostic procedure module. The diagnostic step module is configured to identify diagnostic steps of a service procedure to be performed to diagnose a root cause of a fault on a vehicle based on a diagnostic trouble code identifying the fault. The suboptimal diagnostic procedure module is configured to divide the diagnostic steps into groups based on a probability associated with each of the diagnostic step, determine an order in which to perform the diagnostic steps in each of the groups and the order in which to perform the groups of the diagnostic steps based on the probabilities of the diagnostic steps in each of the groups, and output a suboptimal diagnostic procedure that indicates the diagnostic steps and the order in which to perform the diagnostic steps. The probability indicates a likelihood that performing the corresponding diagnostic step will resolve the fault.

In one aspect, the diagnostic step module is configured to identify a cost associated with performing each of the diagnostic steps, and for each of the groups, the suboptimal diagnostic procedure module is configured to determine the order in which to perform the diagnostic steps that minimizes the cost of diagnosing the fault.

In one aspect, for each of the groups, the suboptimal diagnostic procedure module is configured to determine the order in which to perform the diagnostic steps based on the cost of performing the diagnostic steps and the probability that performing the diagnostic steps will resolve the fault.

In one aspect, the suboptimal diagnostic procedure module is configured to divide the diagnostic steps into the groups based on the probabilities of the diagnostic steps and a predetermined group size.

In one aspect, the suboptimal diagnostic procedure module is configured to identify preconditions for the diagnostic steps and divide the diagnostic steps into the groups based on the probabilities of the diagnostic steps while ensuring that all of the preconditions of each of the groups are satisfied.

In one aspect, the suboptimal diagnostic procedure module is configured to rank the diagnostic steps based on the probabilities of the diagnostic steps, divide the diagnostic steps into the groups based on the ranks, and adjust the ranks so that all of the preconditions of each of the groups are satisfied.

Another example of a system according to the present disclosure includes a diagnostic step module and suboptimal diagnostic procedure module. The diagnostic step module is configured to identify diagnostic steps of a service procedure to be performed to diagnose a root cause of a fault on a vehicle based on a diagnostic trouble code identifying the fault. The suboptimal diagnostic procedure module is configured to identify preconditions of the diagnostic steps, divide the diagnostic steps into groups based on the preconditions, determine an order in which to perform the diagnostic steps in each of the groups and the order in which to perform the groups of the diagnostic steps based on a probability associated with each of the diagnostic step, and output a suboptimal diagnostic procedure that indicates the diagnostic steps and the order in which to perform the diagnostic steps. The probability indicates a likelihood that performing the corresponding diagnostic step will resolve the fault.

In one aspect, the diagnostic step module is configured to determine a cost associated with performing each of the diagnostic steps and, for each of the groups, the suboptimal diagnostic procedure module is configured to determine the order in which to perform the diagnostic steps that minimizes the cost of diagnosing the fault.

In one aspect, the suboptimal diagnostic procedure module is configured to divide the diagnostic steps into subgroups so that all of the diagnostic steps with the same preconditions are in the same subgroup.

In one aspect, the suboptimal diagnostic procedure module is configured to determine the probability that performing the diagnostic steps of each of the subgroups will resolve the fault based on the probability of each of the diagnostic steps in that subgroup, and determine the order in which to perform the subgroups of the diagnostic steps based on the probabilities of the subgroups.

In one aspect, the suboptimal diagnostic procedure module is configured to divide the subgroups of the diagnostic steps into the groups so that at least one of (i) a difference between the probability of a first subgroup in each of the groups and the probability of the first subgroup in the next group is greater than a first threshold, and (ii) a ratio of the probability of the first subgroup in each of the groups and the probability of the first subgroup in the previous group less than a second threshold.

In one aspect, the diagnostic step module is configured to identify a cost associated with performing each of the diagnostic steps, and the suboptimal diagnostic procedure module is configured to determine the cost associated with each of the subgroups based on the cost of performing each of the diagnostics steps in that subgroup, and determine the order in which to perform the subgroups of the diagnostic steps based on the probabilities of the subgroups and the costs of the subgroups.

In one aspect, the suboptimal diagnostic procedure module is configured to rank each of the subgroups based on a product of the probability of that subgroup and the cost of that subgroup, and determine the order in which to perform the subgroups of the diagnostic steps based on the ranks of the subgroups.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle manufacturers typically create a service procedure for each diagnostic trouble code that may be set for every vehicle model. Each service procedure contains a list of tasks to be performed to resolve the issue identified by the corresponding diagnostic trouble code, as well as labor codes identifying the tasks. In many cases, a vehicle controller sets more than one diagnostic trouble code. In these cases, the service technician must perform each service procedure until the issue is resolved. This approach may lead to performing certain tasks that have less probability to fix the issue than other tasks, and may not be an efficient way to diagnose the issue.

Diagnostic techniques have been developed to assist a service technician in diagnosing an issue on a vehicle more efficiently than simply performing the service procedure corresponding to the diagnostic trouble code(s) identifying the issue. For example, U.S. Patent Pub. No. 2020/0184742 describes a method of diagnosing a vehicle fault that involves using field repair data and machine learning to determine the probabilities of vehicle faults. Each vehicle fault may be identified by performing one of the tasks identified by the labor codes. Thus, one may order the labor codes according to their corresponding probabilities to obtain a diagnostic procedure. However, doing so may not diagnose the vehicle fault in the lowest cost way.

A system and method according to the present disclosure identifies diagnostic steps of a service procedure to be performed to diagnose a vehicle fault and identifies the costs and probabilities of the diagnostic steps. The system and method then uses the costs and probabilities of the diagnostic steps to determine an order in which to perform the diagnostic steps that minimizes the cost of diagnosing the vehicle fault. The cost of a diagnostic step may include labor cost and part cost. By accounting for the cost of the diagnostic steps when determining the order in which to perform the diagnostic steps, the system and method obtains a diagnostic procedure that diagnoses the vehicle fault in the lowest cost way.

Figure 1:
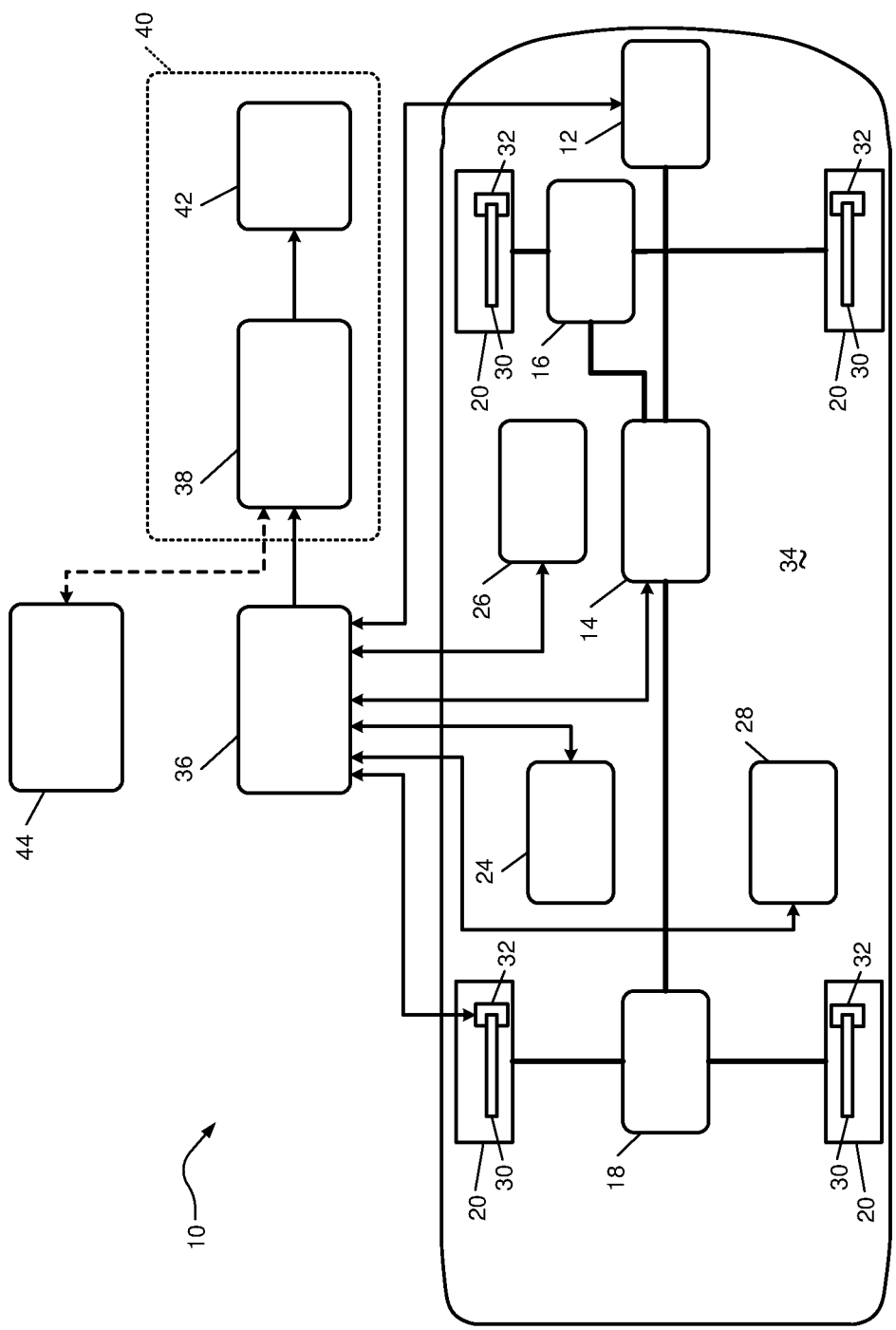
FIG. 1 is a functional block diagram of an example vehicle and an example diagnostic system according to the present disclosure.

Referring now to FIG. 1, a vehicle 10 includes an engine 12, a transmission 14, a front differential 16, a rear differential 18, wheels 20, friction brakes 22, a fuel system 24, a heating, ventilation, and air-conditioning (HVAC) system 26, and an exhaust system 28. The engine 12 combusts a mixture of air and fuel to produce drive torque. The transmission 14 transfers torque produced by the engine 12 to the front and rear differentials 16 and 18 at a plurality of gear ratios.

The front differential 16 transfers torque from the transmission 14 to the front wheels 20 of the vehicle 10 while allowing the front wheels 20 to rotate at different speeds. The rear differential 18 transfers torque from the transmission 14 to the rear wheels 20 of the vehicle 10 while allowing the rear wheels 20 to rotate at different speeds. The friction brakes 22 decrease the speed of the vehicle 10 when the friction brakes 22 are applied. In the example shown, the friction brakes 22 are disc brakes, and each friction brake 22 includes a rotor 30 at a caliper 32. When the friction brake 22 is applied, the caliper 32 presses a pair of brake pads (not shown) against the rotor 30 to create friction and thereby decrease the rotational speed of the wheel 20. The friction brakes 22 collectively make up a brake system of the vehicle 10.

The fuel system 24 supplies fuel to the engine 12. The HVAC system 26 regulates the temperature of air within a cabin 34 of the vehicle 10. In addition, the HVAC system 26 may regulate the temperature of fluids circulating through the engine 12 and the transmission 14. The exhaust system 28 reduces emissions in exhaust gas produced by the engine 12 before releasing the exhaust gas into the atmosphere.

The vehicle 10 further includes a vehicle control module 36 that controls the engine 12, the transmission 14, the friction brakes 22, the fuel system 24, the HVAC system 26, and the exhaust system 28 based on user inputs and sensor inputs. The user inputs indicate target operating parameters of the vehicle 10 such as a target vehicle acceleration, a target vehicle deceleration, a target vehicle speed, and a target cabin temperature. The sensor inputs indicate actual values of operating parameters of the vehicle 10 measured by sensors (not shown) on the vehicle 10. The vehicle control module 36 controls the engine 12, the transmission 14, the friction brakes 22, the fuel system 24, the HVAC system 26, and the exhaust system 28 by outputting control signals thereto.

In addition, when the vehicle 10 experiences a fault, the vehicle control module 36 sets one or more diagnostic trouble codes identifying the fault and records one or more operating parameters of the vehicle 10 when the fault occurs. The vehicle control module 36 may record vehicle operating parameters that are measured by the sensors when the fault occurs. Additionally or alternatively, the vehicle control module 36 may estimate vehicle operating parameters based on other vehicle operating parameters that are measured when the fault occurs and record the estimated vehicle operating parameters. The vehicle control module 36 outputs the diagnostic trouble code(s) and the vehicle operating parameters.

A diagnostic procedure module 38 identifies diagnostic steps of a service procedure to be performed to diagnose the root cause of the fault based on the diagnostic trouble code(s). The diagnostic procedure module 38 determines an order in which to perform the diagnostic steps that minimizes the cost of diagnosing the fault. The diagnostic procedure module 38 outputs a diagnostic procedure indicating the diagnostic steps and the order in which to perform the diagnostic steps. In the example shown, the diagnostic procedure module 38 is part of a service tool 40 that also includes a user interface device 42. In other examples, the diagnostic procedure module 38 and/or the user interface device 42 may be included in the vehicle 10.

The diagnostic procedure module 38 may determine the order in which to perform the diagnostic steps based on a cost associated with each diagnostic step and a probability associated with each diagnostic step. The diagnostic procedure module 38 may determine the costs and probabilities of the diagnostic steps based on the service procedure and/or vehicle repair data. The diagnostic procedure module 38 may receive the vehicle repair data from a cloud module 44 via a wired or wireless signal. The cloud module 44 may be a remote server and/or may be located in a global service headquarters for a manufacturer of the vehicle 10. In the example shown, the diagnostic procedure module 38 and the cloud module 44 communicate with one another using a wireless signal that is represented using a dashed line.

The diagnostic procedure module 38 may control the user interface device 42 to generate a message indicating the diagnostic procedure. The user interface device 42 is operable to generate a visual message (e.g., text, a light, and/or a symbol), an audible message (e.g., a chime), and/or a tactile message (e.g., a vibration). The user interface device 42 may include an electronic display (e.g., a touchscreen), a speaker, and/or a vibrating motor.

Figure 2:
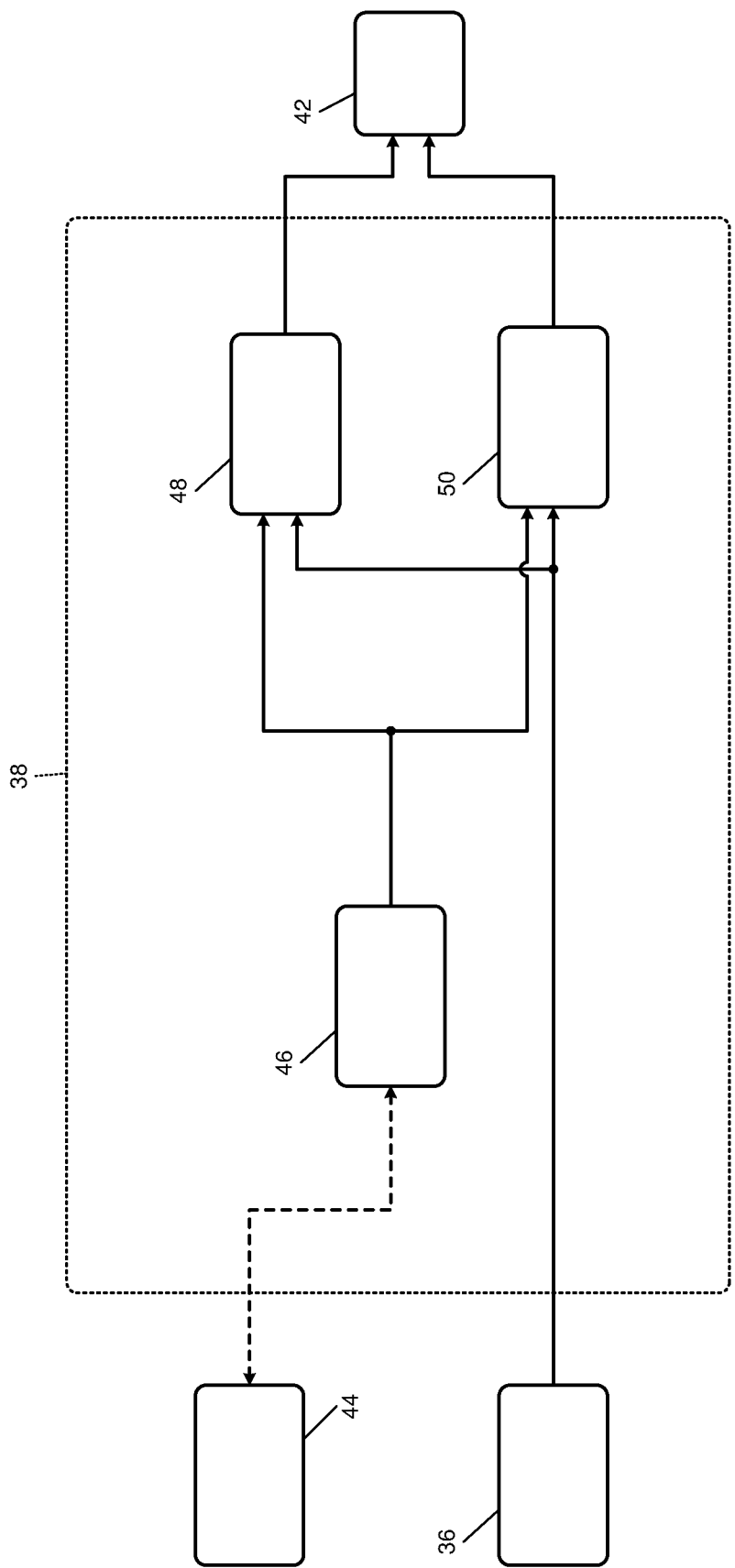
FIG. 2 is a functional block diagram of an example diagnostic procedure module according to the present disclosure.

Referring now to FIG. 2, an example implementation of the diagnostic procedure module 38 includes a diagnostic step module 46, an optimal diagnostic procedure module 48, and a suboptimal diagnostic procedure module 50. The diagnostic step module 46 identifies diagnostic steps of one or more service procedures to be performed to diagnose a root cause of a fault on the vehicle 10 based on one or more diagnostic trouble codes identifying the fault. In addition, the diagnostic step module 46 identifies a cost associated with each diagnostic step and a probability associated with each diagnostic step. The probability indicates the likelihood that performing the corresponding diagnostic step will resolve the fault.

The optimal diagnostic procedure module 48 determines an order in which to perform the diagnostic steps that minimizes the cost of diagnosing the fault. The optimal diagnostic procedure module 48 determines the order in which to perform the diagnostic steps based on the cost of each diagnostic step in the probability of each diagnostic step. The optimal diagnostic procedure module 48 outputs an optimal diagnostic procedure that indicates the diagnostic steps to be performed and the order in which to perform the diagnostic steps. The optimal diagnostic procedure module 48 may control the user interface device 42 to generate a message indicating (e.g., displaying) the optimal diagnostic procedure.

The suboptimal diagnostic procedure module 50 divides the diagnostic steps into groups and determines an order in which to perform the groups of the diagnostic steps based on the probabilities of the diagnostic steps in each group. In addition, for each group, the suboptimal diagnostic procedure module 50 determines the order in which to perform the diagnostic steps that minimizes the cost of diagnosing the fault. The suboptimal diagnostic procedure module 50 outputs a suboptimal diagnostic procedure that indicates the diagnostic steps to be performed and the order in which to perform the diagnostic steps. While the optimal diagnostic procedure may require less cost to perform than the suboptimal diagnostic procedure, the suboptimal diagnostic procedure requires less time and/or processing power to generate. The suboptimal diagnostic procedure module 50 may control the user interface device 42 to generate a message indicating the suboptimal diagnostic procedure.

Figure 3:
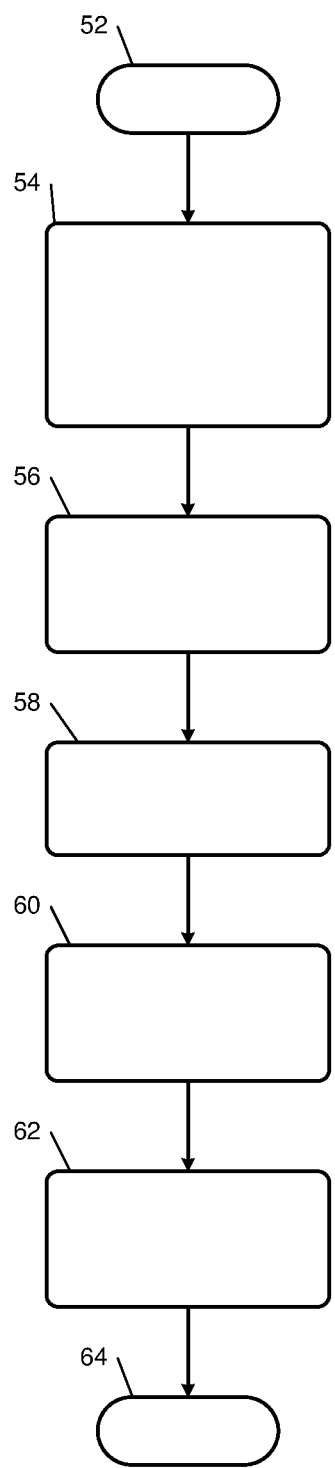
FIG. 3 is a flowchart illustrating an example method of identifying diagnostic steps, costs of the diagnostic steps, and relationships between the diagnostic steps according to the principal the present disclosure.

Referring now to FIG. 3, an example method of identifying diagnostic steps, costs of the diagnostic steps, and relationships between the diagnostic steps begins at step 52. In the description of the methods set forth below, the modules of FIG. 2 perform the steps of the methods. However, the particular modules that perform the steps of the methods may differ from the description below. Additionally or alternatively, one or more steps of the methods may be performed independent of any module.

At step 54, for a given diagnostic trouble code and vehicle model (e.g., the model of the vehicle 10), the diagnostic step module 46 identifies all diagnostic steps, as well and their associated conditions and labor costs in a service procedure. The diagnostic step is an action is taken to diagnose a root cause of the fault. A condition of a diagnostic step may be a vehicle operating parameter or characteristic that is measured or observed when performing a diagnostic step. The condition may be satisfied when the operating parameter or characteristic meets certain criteria (e.g., falls within a predetermined range). Otherwise, the condition may not be satisfied. The labor cost of a diagnostic step is the cost of the labor required to perform the diagnostic step.

The diagnostic step module 46 may store multiple service procedures for one or more vehicle models, and each service procedure may correspond to one of diagnostic trouble codes that may be set in the corresponding vehicle model. Each service procedure may specify a series of diagnostic steps to be performed when the corresponding diagnostic trouble code is set, as well as the labor costs and conditions of the diagnostic steps. The service procedures may be created by the vehicle manufacturer during a design phase of the vehicle model. Additionally or alternatively, the service procedures may be created or modified during a production phase of the vehicle model, and the diagnostic step module 46 may retrieve the service procedures from the cloud module 44.

At step 56, the diagnostic step module 46 identifies preparation steps that the diagnostic steps identified in step 54 have in common with one another. In addition, the diagnostic step module 46 identifies the labor costs associated with the preparation steps. Preparation steps are actions to be taken before the diagnostic steps are performed. The actions specified in the preparation steps may not diagnose the root cause of the fault identified by the diagnostic trouble code. The diagnostic step module 46 obtains the preparation steps and their associated costs from the service procedures. The diagnostic step module 46 may represent the preparation steps as preconditions for the corresponding diagnostic step(s).

At step 58, for the diagnostic steps that involve replacing a vehicle part, the diagnostic step module 46 adds the cost of the vehicle part to the labor cost of the corresponding diagnostic step to obtain the total cost of that diagnostic step. The diagnostic step module 46 may store the cost of all of the parts that may be replaced when diagnosing a root cause of a fault on vehicle using the service procedures. The diagnostic step module 46 may receive the part costs from the cloud module 44.

At step 60, the diagnostic step module 46 identifies dependencies among the diagnostic steps in the service procedure and represents the dependencies as preconditions. For example, according to the service procedure, the condition of one of the diagnostic steps may need to be satisfied before another one of the diagnostic steps may be performed. Thus, the condition of the one diagnostic step being satisfied may be a precondition to the other diagnostic step. If the precondition is not satisfied, the service procedure may specify performing a different diagnostic step.

At step 62, the diagnostic step module 46 stores the diagnostic steps for the given diagnostic trouble code and vehicle model, as well as the costs, preparation steps, and preconditions associated with the diagnostic steps. The method ends at step 62. The method of FIG. 3 may be performed for each diagnostic trouble code that may be set by the vehicle control module 36.

Figures 4, 5, 6:
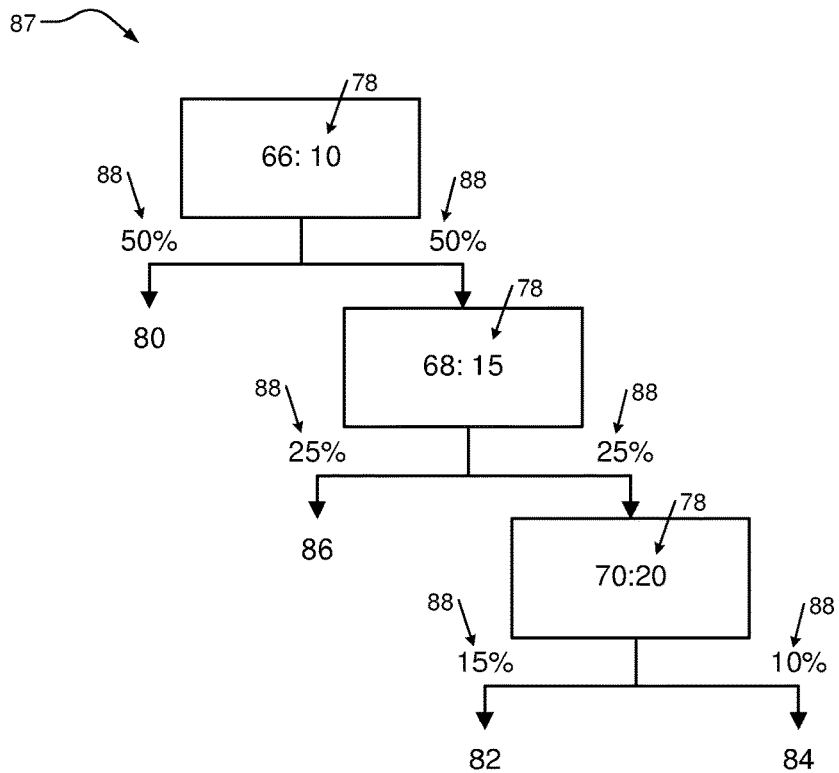
FIG. 4 is a table containing example diagnostic steps, example relationships between the diagnostic steps, example labor codes corresponding to the diagnostic steps, and example costs of the diagnostic steps according to the present disclosure.
FIG. 5 is a table containing the example labor codes of FIG. 4 and example probabilities of the labor codes according to the present disclosure.
FIG. 6 is a flowchart illustrating the example diagnostic step costs and relationships of FIG. 4, as well as example probabilities of the diagnostic steps according to the present disclosure.

Referring now to FIG. 4, a table 65 shows examples of diagnostic steps that may be identified by the diagnostic step module 46 to diagnose the root cause of a fault, as well as preconditions, conditions, and costs associated with the diagnostic steps. The far left column of the table 65 lists a first diagnostic step 66, a second diagnostic step 68, and a third diagnostic step 70. The header row of the table 65 lists preconditions 72, first conditions 74, second conditions 76, and costs 78.

Numbers listed below the preconditions 72 identify diagnostic steps that are preconditions for the diagnostic step listed in the same row. Thus, the first diagnostic step 66 is a precondition for the second diagnostic step 68. Numbers listed below the first and second conditions 74 and 76 indicate labor codes identifying tasks that may be performed if the first and second conditions, respectively, of the diagnostic step listed in the same row is satisfied. The labor codes include a first labor code 80, a second labor code 82, a third labor code 84, and a fourth labor code 86. Thus, if the first conditions of the first, second, or third diagnostic steps 66, 68, and 70 are satisfied, the tasks identified by the first labor code 80, the fourth labor code 86, and the second labor code 82, respectively, may be performed. If the second conditions of the first, second, or third diagnostic step 66, 68, or 70 is satisfied, multiple tasks identified by two or more of the second, third, and fourth labor codes 82, 84, and 86 may be performed. For example, if the second condition 76 of the second diagnostic step 68 is satisfied, the tasks identified by the second and third labor codes 82 and 84 may be performed.

The numbers listed below the costs 78 indicate the costs (e.g., in time units such as minutes) of performing the diagnostic step in the same row. Thus, the cost of the first, second, and third diagnostic steps 66, 68, and 70 is 10, 15, and 20, respectively. The costs 78 may include only the labor cost of the corresponding diagnostic steps. In addition, if the corresponding diagnostic steps involve replacing vehicle parts, the costs 78 may include the cost of a vehicle parts.

Referring now to FIG. 5, a table 67 lists the labor codes of the table 65 and examples of probabilities indicating the likelihood that performing the tasks identified by the labor codes will resolve the fault. The labor codes and their corresponding probabilities may be referred to as the most probable causes of the fault and may be derived using the techniques described in the patent application referenced above and entitled "System and Method for Determining Most Probable Cause of Vehicle Fault using Multiple Diagnostic Techniques." A column 69 lists the first labor code 80, the second labor code 82, the third labor code 84, and the fourth labor code 86. A column 71 lists the probabilities that performing the tasks identified by the labor codes in the same rows will resolve the fault. Thus, there is a 50 percent (%) probability that performing the task identified by the first labor code 80 will resolve the fault, a 25% probability that performing the task identified by the fourth labor code 86 will resolve the fault, a 15% probability that performing the task identified by the second labor code 82 will resolve the fault, and a 10% probability that performing the task identified by the third labor code 84 will resolve the fault.

Referring now to FIG. 6, a flowchart 87 illustrates the relationships between the diagnostic steps shown in FIG. 4, and shows the costs 78 associated with the diagnostic steps and probabilities 88 associated with the labor codes. If the first condition of the first diagnostic step 66 is satisfied, the task identified by first labor code 80 is performed, and the probability 88 that performing that task will resolve the fault is equal to 50%. If the second condition of the first diagnostic step 66 is satisfied, the second diagnostic step 68 is performed, and the probability that performing the second and third diagnostic steps 68 and 70 (associated with the second, third, and fourth labor codes 82, 84, and 86) will resolve the fault is equal to the sum of 25% and 15% and 10%, which is 50%.

If the first condition of the second diagnostic step 68 is satisfied, the task identified by the fourth labor code 86 is performed, and the probability 88 that performing that task will resolve the fault is equal to 25%. If the second condition of the second diagnostic step 68 is satisfied, the third diagnostic step 70 is performed, and the probability that performing the third diagnostic step 70 (associated with the second and third labor codes 82 and 84) will resolve the fault is equal to the sum of 15% and 10%, which is 25%.

If the first condition of the third diagnostic step 70 satisfied, the task identified by the second labor code 82 is performed, and the probability 88 that performing that task will resolve the fault is equal to 15%. If the second condition of the third diagnostic step 70 is satisfied, the task identified by the third labor code 84 is performed, and the probability 88 that performing that task will resolve the fault is equal to 10%.

Figure 7:
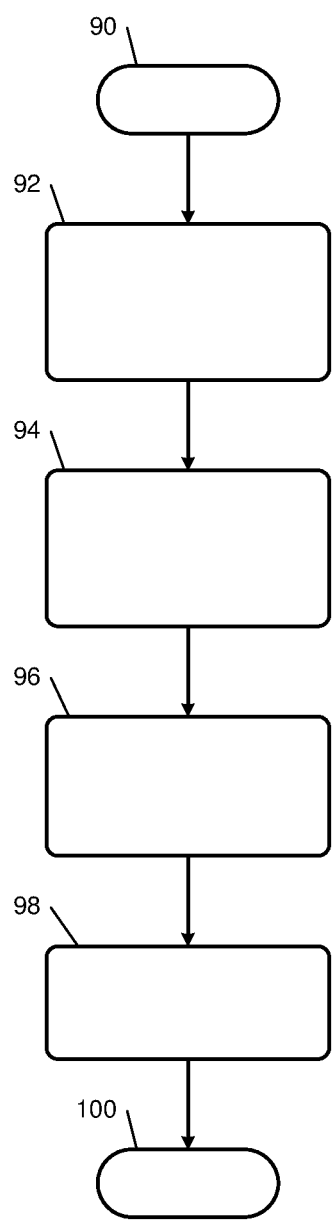
FIG. 7 is a flowchart illustrating an example method of determining an optimal diagnostic procedure according to the present disclosure.

Referring now to FIG. 7, a method of determining an optimal diagnostic procedure begins at step 90. At step 92, the diagnostic step module 46 obtains diagnostic steps, labor codes with probability distribution, tests, preconditions, labor code group splits for conditions, and costs. The diagnostic step module 46 may obtain the diagnostic steps, the tests, the preconditions, the labor code group splits for conditions, and the costs from a service procedure for a given diagnostic trouble code and vehicle model. In one example, the diagnostic step module 46 obtains a labor code group ($LC_g = LC_1, LC_2, \ldots LC_n$) with a probability distribution {$p(LC_1)$, $(pLC_2) \ldots p(LC_n)$}, test or diagnostic step set ($T_h$, h=1, 2, ... n), pre-condition test set {h-pre}, labor code group splits ($LCg_m$, $LCg_n$) for conditions (1, 2), and cost $C(T_h)$.

The service procedure may group the diagnostic steps into the tests. The labor codes obtained by the diagnostic step module 46 may include the labor codes to be performed when the conditions of the diagnostic steps are satisfied. The probability distribution includes the probabilities that performing the tasks identified by the labor codes will resolve the fault identified by the diagnostic trouble code. The preconditions include preparation steps and/or some of the diagnostic steps that are to be performed before performing others of the diagnostic steps. The labor code group splits include, for each diagnostic step, a list of labor codes that may be performed if one condition of the diagnostic step is satisfied, and another list of labor codes may be performed if another condition of the diagnostic step is satisfied.

At step 94, the optimal diagnostic procedure module 48 recursively finds the minimum cost to perform the tasks identified by all of the labor codes in each test of a set of tests having the same preconditions while satisfying one or more constraints. The optimal diagnostic procedure module 48 may determine the minimum cost of the test set using dynamic programming. In one example, to obtain a minimum cost $V(T_h, LC_g)$ of a set of tests $T=\{T_k, k=1, 2, \ldots\}$ that includes a labor code group ($LCg_k$), the optimal diagnostic procedure module 48 selects the test $T_h$ of the test set to perform first, determines the cost $C(T_h)$ of performing the selected test, determines the minimum cost to perform the diagnostic steps of each of the other test, and determines the sum of the cost to perform the diagnostic steps of the selected tests and the minimum costs to perform the diagnostic steps of the other tests using a relationship such as $$V(T_h, LCg_k) = \\ C(T_h) + \frac{p(LCg_m)}{p(LCg_k)} * \min_{T_i \in T} V(T_i, LCg_m) + \frac{p(LCg_n)}{p(LCg_k)} * \min_{T_j \in T} V(T_j, LCg_n) \quad (1)$$

where $T_h$ is the first test, $C(T_h)$ is the cost of the test $T_h$, $T_i$ is the test that is conducted if condition one of the test $T_h$ is satisfied, $V(T_i, LCg_i)$ is the minimum cost to perform all of the tasks associated with the labor code group $LCg_m$ starting from the test $T_i$, $T_j$ is the test that is conducted if condition two of the test $T_h$ is satisfied, $V(T_j, LCg_m)$ is the minimum cost to perform all of the tasks associated with the labor code group $LCg_m$ starting from the test $T_j$, $p(LCg_m)$ is the probability of the labor code group $LCg_m$, $p(LCg_n)$ is the probability of the labor code group $LCg_n$, and $p(LCg_k)$ is the probability of the labor code group $LCg_k$ that includes all of the labor codes of the test set.

The constraints may include a first constraint, a second constraint, and/or a third constraint. The first constraint is satisfied if all of the preconditions for the diagnostic steps in the test set are completed before the first test $T_h$ is performed. The second constraint is satisfied if performing the tasks identified by the labor codes associated with the first test $T_h$ enables completing the tasks identified by all of the labor codes in the test set when the first test $T_h$ is performed first. The third constraint is satisfied if the cost is set to zero when no further diagnosis is needed.

Relationship (1) may be better understood with reference to the example illustrated in FIGS. 4 through 6. In that example, the first, second, third, and fourth labor codes 80, 82, 84, and 86 may make up a labor code group $LCg_k$ of a test set that includes first, second, third, and fourth tests ($T_h$, $T_i$, $T_j$, $T_k$). The first test $T_h$ is performed first and consists of performing the first diagnostic step 66. Thus, the cost of the first test $T_h$ is 10. The repair represented by the labor code 80 is performed if the first condition 74 of the first test $T_h$ is satisfied and no further diagnostic is needed. Thus, the cost of the second test $T_i$ is zero since the test $T_i$ is empty (i.e., does not include any diagnostic steps).

The second test $T_i$ (i.e., the second diagnostic step 68) is performed if the second condition 76 of the first test $T_h$ (i.e., the first diagnostic step 66) is satisfied. If the first condition 74 of the second diagnostic step 68 is satisfied after performing that step, then the repair represented by the fourth labor code 86 is performed and no further diagnostics is needed. If the second condition 76 of the second diagnostic step 68 is satisfied, then the third test $T_k$ (i.e., the third diagnostic step 70) is performed. The repairs represented by the second and third labor codes 82 and 84 will be performed accordingly based on whether the first or the second condition 74 or 76 of the third diagnostic step 70 is satisfied. No additional diagnostic is need for either case. Thus, the probabilities and costs of FIGS. 4 through 6 may be inserted into relationship (1) to obtain the cost of the test set as follows:

$$V(66,\{80,82,84,86\})=10+(p(82)+p(84)+p(86))/(p(80)+p(82)+p(84)+p(86))*V(68,\{82,84,86\})$$

$$V(68,\{82,84,86\})=15+(p(82)+p(84))/(p(82)+p(84)+p(86))*V(70,\{82,84\})=15+25\%/50\%*V(70,\{82,84\})$$

$$V(70,\{82,84\})=20$$

$$\text{Cost}=V(66,\{80,82,84,86\})=10+50\%*(15+25\%/50\%*20)=22.5$$

The optimal diagnostic procedure module 48 may select different tests in a test set to perform first, determine the sum of the cost of the selected test and the minimum costs of the other tests in the test set, and set the order in which to perform the tests so that the selected test is performed first when the sum is less than the sum of the cost of performing any of the other tests first and the minimum costs of performing the selected test and the remainder of the other tests. For example, the optimal diagnostic procedure module 48 may set the order of the tests $T_h$, $T_i$, $T_j$, $T_k$ so that the test $T_h$ is performed first when the cost obtain using relationship (1) when the test $T_h$ is performed first is less than the cost obtain using relationship (1) when any one of the tests $T_i$, $T_j$, or $T_k$ are performed first.

Figure 8:
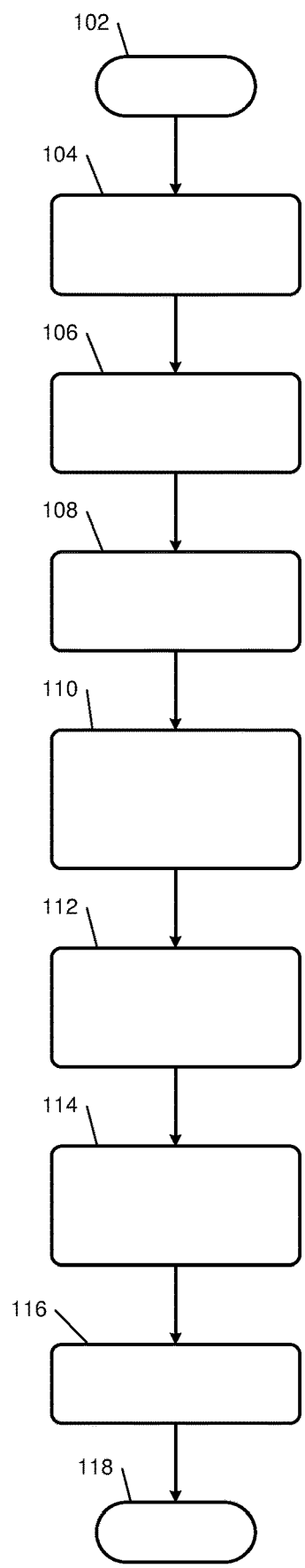
FIGS. 8 and 9 are flowcharts illustrating example methods of determining a suboptimal diagnostic procedure according to the present disclosure.

Referring now to FIG. 8, a method of determining a suboptimal diagnostic procedure begins at step 102. Before the method of FIG. 8 is performed, the diagnostic step module 46 may identify diagnostic steps of a service procedure to be performed for a given diagnostic trouble code, as well as preconditions, costs, and probabilities of the diagnostic steps. At step 104, the suboptimal diagnostic procedure module 50 ranks the diagnostic steps based on the probabilities of the diagnostic steps. For example, the suboptimal diagnostic procedure module 50 may assign the highest rank to the diagnostic step with the highest probability and assign the lowest rank to the diagnostic step with the lowest probability. The suboptimal diagnostic procedure module 50 may use the ranks to determine the order in which the diagnostic steps are to be performed. For example, the suboptimal diagnostic procedure module 50 may arrange the diagnostic steps in ascending order from the diagnostic step with the highest rank (e.g., number 1) to the diagnostic step with the lowest rate (e.g., number 50).

At step 106, the suboptimal diagnostic procedure module 50 adjusts the ranks of the diagnostic steps so that the preconditions of the diagnostic steps are satisfied when the diagnostic steps are performed in ascending order according to their rank. At step 108, the suboptimal diagnostic procedure module 50 divides the ranked diagnostic steps into groups of a predetermined size (e.g., 10 diagnostic steps per group). In addition, the suboptimal diagnostic procedure module 58 determine the order in which to perform the each group based on the probabilities of the diagnostic steps in that group. For example, the group with the diagnostic steps having the highest probabilities may be performed first and the group with the diagnostic steps having the lowest probabilities may be performed last. At step 110, the suboptimal diagnostic procedure module 50 adjusts the diagnostic steps across the different groups to ensure that the preconditions of each group are satisfied. The preconditions may include preparation steps and/or other diagnostic steps to be performed before the diagnostic steps in the each group.

At step 112, the suboptimal diagnostic procedure module 50 finds the optimal procedure for each group using the method of FIG. 7. In other words, for each group, the suboptimal diagnostic procedure module 50 determines the order in which to perform the diagnostic steps that minimizes the cost of diagnosing the fault. At step 114, the suboptimal diagnostic procedure module 50 integrates the procedures from all of the groups according to their order to obtain the suboptimal diagnostic procedure. At step 116, the suboptimal diagnostic procedure module 50 outputs the suboptimal diagnostic procedure. The method ends at step 118.

Figure 9:
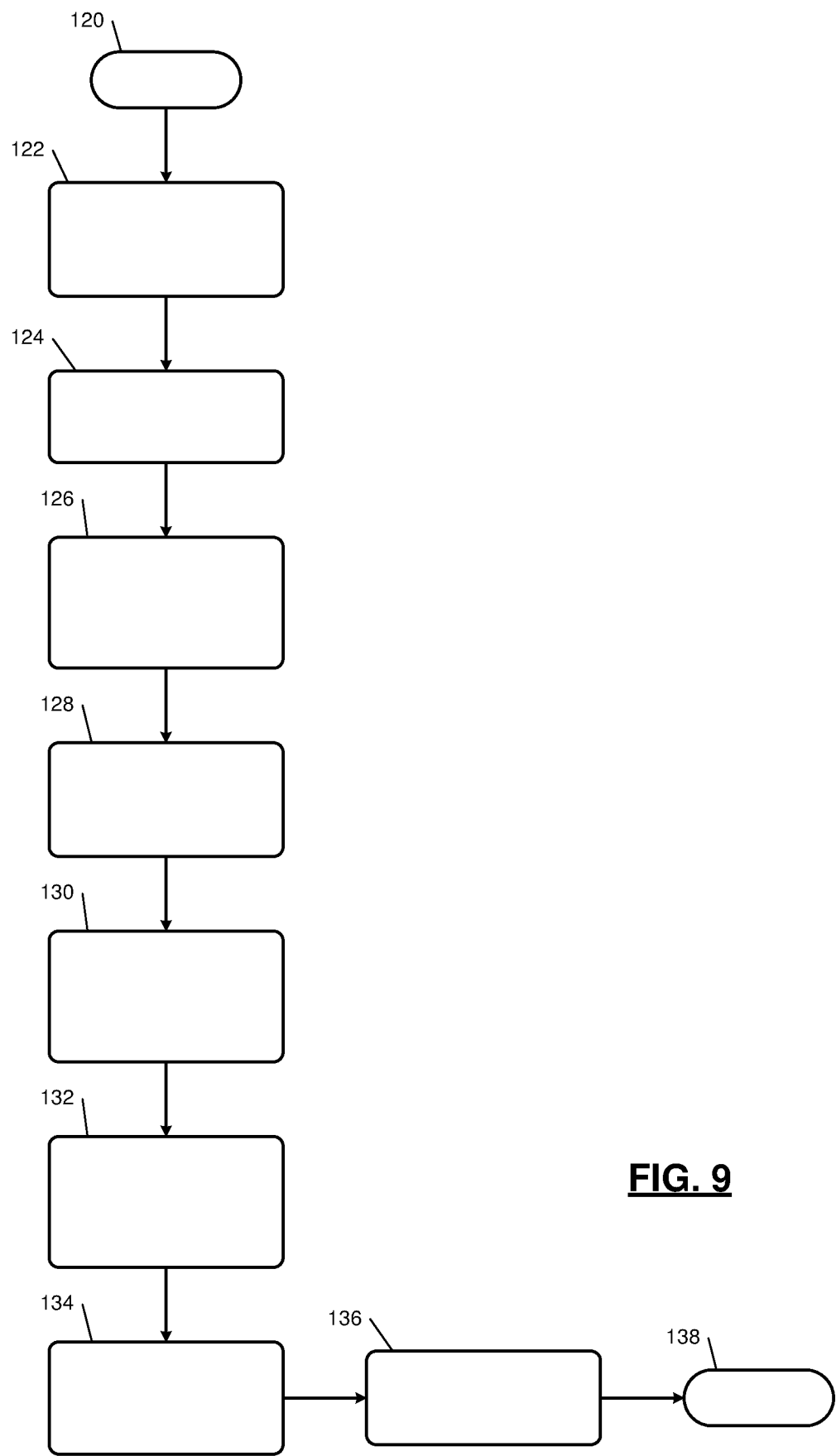

Referring now to FIG. 9, another method of determining a suboptimal diagnostic procedure begins at step 120. Before the method of FIG. 9 is performed, the diagnostic step module 46 may identify diagnostic steps of a service procedure to be performed for a given diagnostic trouble code, as well as preconditions, costs, and probabilities of the diagnostic steps. At step 122, the suboptimal diagnostic procedure module 50 divides the diagnostic steps into subgroups based on their preconditions. For example, the suboptimal diagnostic procedure module 50 may place all of the diagnostic steps with the same preconditions in the same subgroup. The preconditions may include preparation steps and/or other diagnostic steps to be performed before the diagnostic steps in the subgroup.

At step 124, the suboptimal diagnostic procedure module 50 determines an aggregate probability of each subgroup. For example, the suboptimal diagnostic procedure module 50 may determine the sum of the probabilities of the diagnostic steps and each subgroup to obtain the aggregate probability of that subgroup. At step 126, the suboptimal diagnostic procedure module 50 finds the optimal procedure and associated aggregate costs for each subgroup using the method of FIG. 7. In other words, for each subgroup, the suboptimal diagnostic procedure module 50 determines the order in which to perform the diagnostic steps that minimizes the cost of diagnosing the fault. At step 128, the suboptimal diagnostic procedure module 50 ranks the subgroups by their aggregate probabilities so that the subgroup with the highest aggregate probability is ranked first in the order and the subgroup with the lowest aggregate probability is ranked last in the order.

At step 130, the suboptimal diagnostic procedure module 50 divides the subgroups into groups based on a decrease in probability from one of the subgroups to another one of the subgroups. In one example, the suboptimal diagnostic procedure module 50 divides the subgroups into groups so that a difference between the probability of a first subgroup in each group and the probability of the first subgroup in the next group is greater than a first threshold (e.g., 60%). In another example, the suboptimal diagnostic procedure module 50 divides the subgroups into groups so that a ratio of the probability of the first subgroup in each of the groups and the probability of the first subgroup in the previous group less than a second threshold (e.g., 10%). The first and second thresholds may be predetermined.

At step 132, within each of the groups, the suboptimal diagnostic procedure module 50 reorders the subgroups based on their aggregate probabilities and their aggregate costs. In one example, the suboptimal diagnostic procedure module 50 subtracts the aggregate probability of each subgroup from one, and multiplies the difference by the aggregate cost of that subgroup to obtain a rank for that subgroup. The suboptimal diagnostic procedure module 58 then orders the subgroups within each group based on the ranks of the subgroups, with the lowest ranked subgroup being first in the order and the highest ranked subgroup being last in the order. The resulting order for each subgroup is the diagnostic procedure for that subgroup.

At step 134, the suboptimal diagnostic procedure module integrates the diagnostic procedures from all of the groups according to the orders of the groups. The suboptimal diagnostic procedure module 50 may assign an order to each group when dividing the subgroups into the groups. For example, the suboptimal diagnostic procedure module 50 may rank each group based on the aggregate probabilities of its subgroups by assigning the highest rank to the group with the highest aggregate probabilities and the lowest rank to the group with the lowest aggregate probabilities. The suboptimal diagnostic procedure module 50 may then assign an order to each group so that the group with the lowest rank is first in the order and the group with the highest rank is last in the order to obtain the suboptimal diagnostic procedure. At 136, the suboptimal diagnostic procedure module 50 outputs the suboptimal diagnostic procedure. The method ends at step 138.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a diagnostic step module configured to:
identify diagnostic steps of a service procedure to be performed to diagnose a root cause of a fault on a vehicle based on a diagnostic trouble code identifying the fault; and
identify a cost associated with performing each of the diagnostic steps; and
an optimal diagnostic procedure module configured to:
determine an order in which to perform the diagnostic steps that minimizes the cost of diagnosing the fault; and
output an optimal diagnostic procedure that indicates the diagnostic steps and the order in which to perform the diagnostic steps.

2. The system of claim 1 wherein:
the diagnostic step module is configured to identify preparation steps that multiple ones of the diagnostic steps have in common with one another; and
the optimal diagnostic procedure module is configured to determine the order in which to perform the diagnostic steps based on the common preparation steps.

3. The system of claim 1 wherein:
the diagnostic step module is configured to identify those of the diagnostic steps that are prerequisites for others of the diagnostic steps; and
the optimal diagnostic procedure module is configured to determine the order in which to perform the diagnostic steps based on the prerequisite diagnostic steps.

4. The system of claim 1 wherein, if the diagnostic steps involve replacing a part on the vehicle, the diagnostic step module is configured to include the cost of the part in the cost of performing the diagnostic steps.

5. The system of claim 1 wherein the optimal diagnostic procedure module is configured to determine the order in which to perform the diagnostic steps based on the cost of performing the diagnostic steps and a probability that performing the diagnostic steps will resolve the fault.

6. The system of claim 1 wherein:
the service procedure groups the diagnostic steps into tests; and
the optimal diagnostic procedure module is configured to determine the order in which to perform the tests that minimizes the cost of diagnosing the fault.

7. The system of claim 6 wherein the optimal diagnostic procedure module is configured to:
select different ones of the tests to perform first;
determine the cost of performing the diagnostic steps of the selected test;
determine a minimum cost of performing the diagnostic steps of each of the other tests;
determine a sum of the cost of performing the diagnostic steps of the selected test and the minimum cost of performing the diagnostic steps of the other tests; and
set the order in which to perform the tests so that the selected test is performed first when the sum of the cost of performing the diagnostic steps of the selected test is less than the sum of the cost of performing any of the other tests first.

8. A system comprising:
a diagnostic step module configured to identify diagnostic steps of a service procedure to be performed to diagnose a root cause of a fault on a vehicle based on a diagnostic trouble code identifying the fault; and
a suboptimal diagnostic procedure module configured to:
divide the diagnostic steps into groups based on a probability associated with each of the diagnostic steps, wherein the probability indicates a likelihood that performing the corresponding diagnostic step will resolve the fault;
determine an order in which to perform the diagnostic steps in each of the groups and the order in which to perform the groups of the diagnostic steps based on the probabilities of the diagnostic steps in each of the groups; and
output a suboptimal diagnostic procedure that indicates the diagnostic steps and the order in which to perform the diagnostic steps.

9. The system of claim 8 wherein:
the diagnostic step module is configured to identify a cost associated with performing each of the diagnostic steps; and
for each of the groups, the suboptimal diagnostic procedure module is configured to determine the order in which to perform the diagnostic steps that minimizes the cost of diagnosing the fault.

10. The system of claim 9 wherein, for each of the groups, the suboptimal diagnostic procedure module is configured to determine the order in which to perform the diagnostic steps based on the cost of performing the diagnostic steps and the probability that performing the diagnostic steps will resolve the fault.

11. The system of claim 8 wherein the suboptimal diagnostic procedure module is configured to divide the diagnostic steps into the groups based on the probabilities of the diagnostic steps and a predetermined group size.

12. The system of claim 8 wherein the suboptimal diagnostic procedure module is configured to identify preconditions for the diagnostic steps and divide the diagnostic steps into the groups based on the probabilities of the diagnostic steps while ensuring that all of the preconditions of each of the groups are satisfied.

13. The system of claim 12 wherein the suboptimal diagnostic procedure module is configured to:
rank the diagnostic steps based on the probabilities of the diagnostic steps;
divide the diagnostic steps into the groups based on the ranks; and
adjust the ranks so that all of the preconditions of each of the groups are satisfied.

14. A system comprising:
a diagnostic step module configured to identify diagnostic steps of a service procedure to be performed to diagnose a root cause of a fault on a vehicle based on a diagnostic trouble code identifying the fault; and
a suboptimal diagnostic procedure module configured to:
identify preconditions of the diagnostic steps;
divide the diagnostic steps into groups based on the preconditions;
determine an order in which to perform the diagnostic steps in each of the groups and the order in which to perform the groups of the diagnostic steps based on a probability associated with each of the diagnostic step, wherein the probability indicates a likelihood that performing the corresponding diagnostic step will resolve the fault; and
output a suboptimal diagnostic procedure that indicates the diagnostic steps and the order in which to perform the diagnostic steps.

15. The system of claim 14 wherein:
the diagnostic step module is configured to determine a cost associated with performing each of the diagnostic steps; and
for each of the groups, the suboptimal diagnostic procedure module is configured to determine the order in which to perform the diagnostic steps that minimizes the cost of diagnosing the fault.

16. The system of claim 14 wherein the suboptimal diagnostic procedure module is configured to divide the diagnostic steps into subgroups so that all of the diagnostic steps with the same preconditions are in the same subgroup.

17. The system of claim 16 wherein the suboptimal diagnostic procedure module is configured to:
determine the probability that performing the diagnostic steps of each of the subgroups will resolve the fault based on the probability of each of the diagnostic steps in that subgroup; and
determine the order in which to perform the subgroups of the diagnostic steps based on the probabilities of the subgroups.

18. The system of claim 17 wherein the suboptimal diagnostic procedure module is configured to divide the subgroups of the diagnostic steps into the groups so that at least one of:
a difference between the probability of a first subgroup in each of the groups and the probability of the first subgroup in the next group is greater than a first threshold; and
a ratio of the probability of the first subgroup in each of the groups and the probability of the first subgroup in the previous group is less than a second threshold.

19. The system of claim 18 wherein:
the diagnostic step module is configured to identify a cost associated with performing each of the diagnostic steps; and
the suboptimal diagnostic procedure module is configured to:
determine the cost associated with each of the subgroups based on the cost of performing each of the diagnostics steps in that subgroup; and
determine the order in which to perform the subgroups of the diagnostic steps based on the probabilities of the subgroups and the costs of the subgroups.

20. The system of claim 19 wherein the suboptimal diagnostic procedure module is configured to:
rank each of the subgroups based on a product of the probability of that subgroup and the cost of that subgroup; and
determine the order in which to perform the subgroups of the diagnostic steps based on the ranks of the subgroups.

* * * * *